(12) United States Patent
Asmar et al.

(10) Patent No.: US 7,908,170 B2
(45) Date of Patent: Mar. 15, 2011

(54) SYSTEM AND METHOD FOR FACILITATING COMMERCIAL TRANSACTIONS

(76) Inventors: Alejandro G. Asmar, Rio Piedras, PR (US); Arturo Diaz, Rio Piedras, PR (US)

( * ) Notice: Subject to any disclaimer, the term of this patent is extended or adjusted under 35 U.S.C. 154(b) by 934 days.

(21) Appl. No.: 11/338,634

(22) Filed: Jan. 25, 2006

(65) Prior Publication Data

US 2007/0174120 A1    Jul. 26, 2007

(51) Int. Cl.
    *G06Q 30/00*    (2006.01)
    *G06F 17/00*    (2006.01)

(52) U.S. Cl. .......................... 705/14.27; 705/10; 705/64

(58) Field of Classification Search ............ 705/10, 705/14, 64, 14.26, 36 T, 14.27
See application file for complete search history.

(56) References Cited

U.S. PATENT DOCUMENTS

| | | | |
|---|---|---|---|
| 6,014,635 A | 1/2000 | Harris et al. | |
| 7,580,856 B1* | 8/2009 | Pliha | 705/14.26 |
| 2001/0014868 A1 | 8/2001 | Herz et al. | |
| 2002/0026348 A1* | 2/2002 | Fowler et al. | 705/10 |
| 2002/0062253 A1* | 5/2002 | Dosh et al. | 705/14 |
| 2002/0123971 A1* | 9/2002 | Maritzen et al. | 705/64 |
| 2002/0174011 A1 | 11/2002 | Sanchez et al. | |
| 2002/0188511 A1 | 12/2002 | Johnson et al. | |
| 2002/0198803 A1 | 12/2002 | Rowe | |
| 2003/0212595 A1 | 11/2003 | Antonucci | |
| 2003/0233278 A1 | 12/2003 | Marshall | |
| 2004/0083183 A1 | 4/2004 | Hardesty et al. | |
| 2004/0107135 A1 | 6/2004 | Deatherage et al. | |
| 2004/0122736 A1 | 6/2004 | Strock et al. | |
| 2004/0260607 A1 | 12/2004 | Robbins et al. | |
| 2005/0021400 A1 | 1/2005 | Postrel | |
| 2005/0021405 A1* | 1/2005 | Agarwal | 705/14 |
| 2005/0055281 A1 | 3/2005 | Williams | |
| 2005/0114213 A1* | 5/2005 | Smith et al. | 705/14 |
| 2005/0144066 A1 | 6/2005 | Cope et al. | |
| 2006/0064320 A1 | 3/2006 | Postrel | |
| 2006/0155603 A1* | 7/2006 | Abendroth et al. | 705/14 |
| 2007/0185803 A1* | 8/2007 | Harrison et al. | 705/36 T |

OTHER PUBLICATIONS

PCT/US06/44938 International Search Report, Sep. 24, 2009.
PCT/US06/44938 Written Opinion of the International Searching Authority, Sep. 24, 2009.
PCT/US2008/003426 International Preliminary Report on Patentability; Sep. 24, 2009.

* cited by examiner

*Primary Examiner* — John G Weiss
*Assistant Examiner* — Marilyn Macasiano
(74) *Attorney, Agent, or Firm* — Merek, Blackmon & Voorhees, LLC

(57) ABSTRACT

An electronic fund transfer system that provides vital marketing information to participating merchants and purchasing records to customers while offering the most efficient and effective system to deliver the best terms and conditions for the products and services requested by customers. The system includes an electronic funds transfer card that can be used as a debit or charge card to purchase goods and services. At checkout, the system operates invisibly to the consumer and the cashier. Approval of the transaction operates similarly to a conventional debit card or credit card. All discounts are managed by the data clearinghouse which receives consumer data and merchant data. The clearinghouse communicates with the financial institution and forwards a statement which displays the accumulated discounts to the consumer.

9 Claims, 3 Drawing Sheets

SYSTEM AND METHOD FOR FACILITATING COMMERCIAL TRANSACTIONS

FIELD OF THE INVENTION

This invention relates to an electronic based capture system for facilitating commercial transactions including a customer reward program.

BACKGROUND OF THE INVENTION

Customer loyalty reward programs have been proposed in which financial institutions issue payment cards to consumers. The financial institutions authorize merchants to honor the payment cards allowing consumers to purchase goods and services using the payment cards. Various consumer rewards programs have been affiliated with the cards including cash back on a percentage of total purchases or frequent flyer miles or redeemable points for merchandise, services or travel or even retirement accounts. These rewards programs are usually applied monthly when the statement is issued. However, the rewards are not based on specific items, but are generally based on the total monthly or annual gross receipts. Therefore, the specific purchases are not related to the customer, but instead only the store code is related to a customer so that tracking of individual items is not possible to develop specific customer buying habits, but only develop a track of what stores were patronized by the customer.

Similarly, grocery chains have issued customer discount cards which provide customers with store discounts which are credited to the consumer at checkout. These customer discount cards are not credit cards or charge cards, but are merely customer account identification cards. Furthermore, the discount is provided at checkout by the merchant or chain, not the product manufacturer unless the chain itself manufactures the product. These store discount cards have the advantage of being able to track customer shopping habits as well as demographic information to assist the store in development of marketing strategies for products and services, but the store discount cards can only be used at the particular store or chain and therefore does not track shopping habits outside of the products supplied by the particular store.

In view of the foregoing, it can be seen that there is a need for an electronic based capture system that provides a paperless, administratively free unobtrusive environment capable of identifying, recording and reporting, special offers and discount transactions to consumers.

OBJECTS OF THE INVENTION

One object of the invention is to provide an electronic capture system capable of identifying, recording and reporting special offers and discount transactions to customers.

Another object of the invention is to provide an electronic fund transfer card for use with the electronic capture system.

Yet another object of the invention is a system that captures electronic fund transfer data from banks, points of sale and transaction files.

Still another object of the invention is a system that interphases with affiliated merchant computer systems.

Yet another object of the invention is a system that records individual purchasing data for merchants for more effective marketing strategies.

Still another object of the invention is to provide a discount system for consumers that operates discreetly so that no inconvenience is added at checkout.

Another object of the invention is to provide a data clearinghouse which interacts with merchants, consumers and financial institutions.

Yet another object of the invention is to provide a Merchant/Cellular Program and Switch System which facilitates sales using cellular telephone technology.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

SUMMARY OF THE INVENTION

An electronic fund transfer system that provides vital marketing information to participating merchants and purchasing records to customers while offering the most efficient and effective system to deliver the best terms and conditions for the products and services requested by customers. The system includes an electronic funds transfer card that can be used as a debit or charge card to purchase goods and services. At checkout, the system operates invisibly to the consumer and the cashier. Approval of the transaction operates similarly to a conventional debit card or credit card. All discounts are managed by the data clearinghouse which receives consumer data and merchant data. The clearinghouse communicates with the financial institution and forwards a statement which displays the accumulated discounts to the consumer. In an alternative embodiment, cellular communications are employed to transmit transaction information between financial institutions and the customer and merchant.

The system would preferably include participation by multiple financial institutions, a wide variety of merchants which would include retail stores, online sellers, manufacturers of products and service providers. Consumers join the reward system by providing financial and demographic information in a similar manner as applying for a credit or debit card.

DETAILED DESCRIPTION OF THE PREFERRED EMBODIMENT

Figure 1:
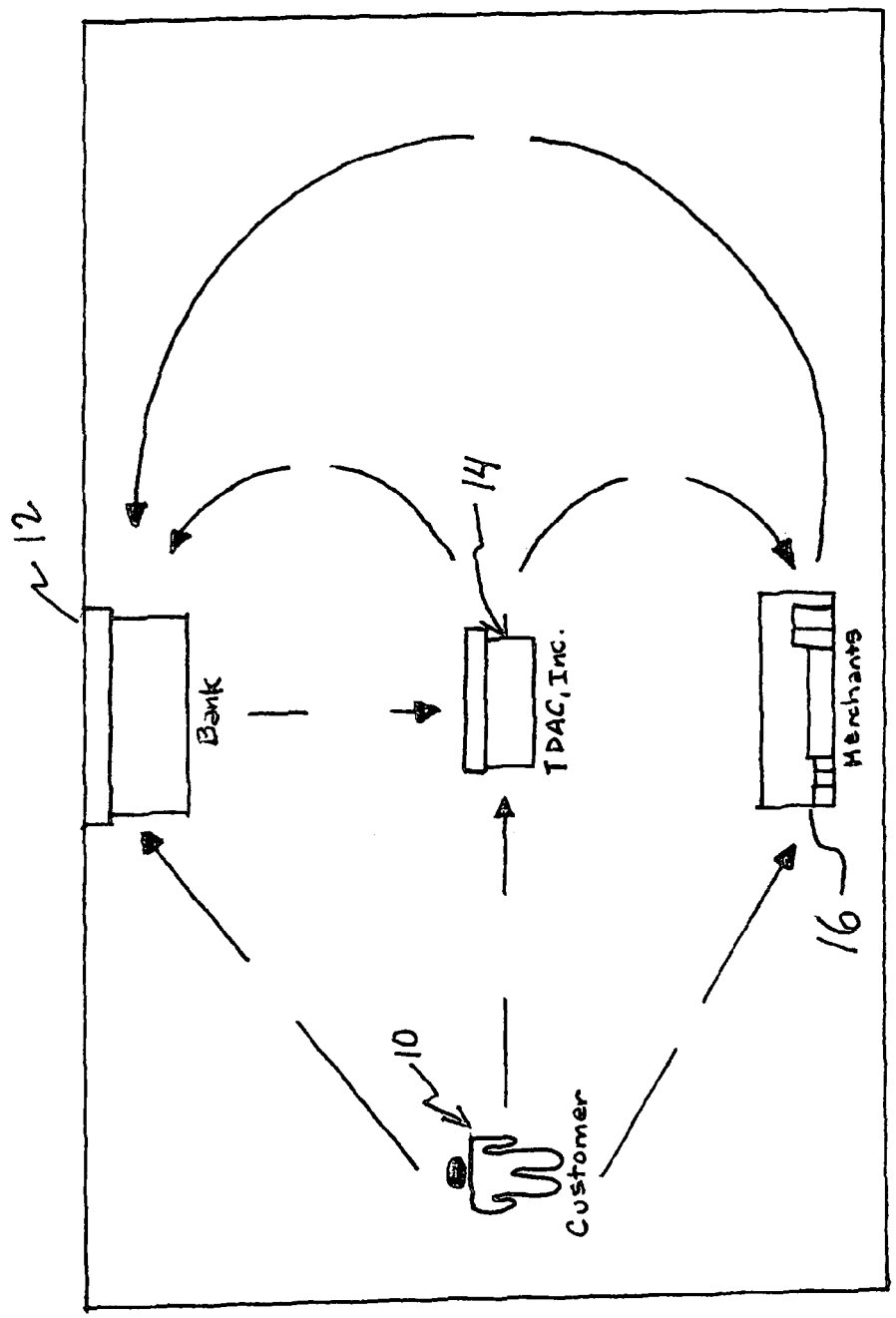
FIG. 1 is a diagram showing the membership account opening process.

With reference to FIG. 1, the process by which a customer can open an account to become a club member with the buying program is shown. The customer 10 initiates the process by sending an application form to open an account with a participating financial institution 12, a transaction clearinghouse 14 and to participating merchants 16. The financial institution 12 and the clearinghouse 14 communicate to verify the customer's 10 application and qualifications to participate in the buying program. The clearinghouse 14 also communicates with participating merchants 16 regarding the customer's participation in the buying program. The customer receives a buying card with indicia in the form of numbers, bar codes, magnetic strip or other electronic or machine readable media.

Merchants 16 who are subscribers with member financial institutions also register with the transaction clearinghouse 14 to participate in the program.

Figure 2:
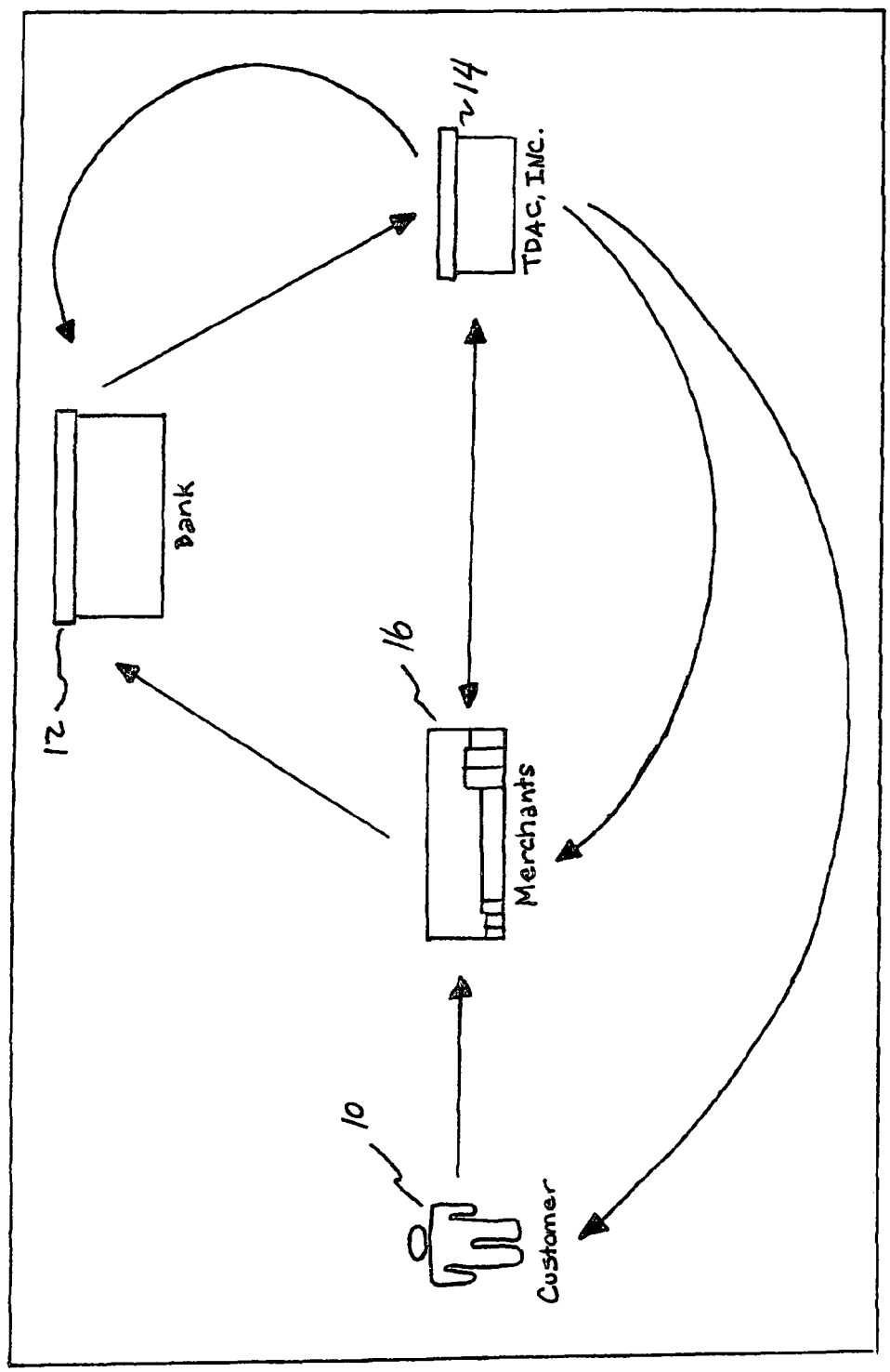
FIG. 2 is a diagram showing the purchasing transaction process

Now the process by which an actual transaction occurs will be described with reference to FIG. 2. The first step is that a customer 10 initiates a purchase from a participating merchant 16 using a debit or charge card issued from a participating financial institution 12. As in a typical credit card transaction, the card is scanned at the store credit card scanner. The purchase is recorded as in a conventional transaction and the customer 10 receives a receipt for the full price and takes the product purchased.

At the merchant level, the transaction is approved by the financial institution 12 in the traditional process so that the merchant 16 is assured of payment. The financial institution 12 then transmits the purchase information to the transaction clearinghouse 14 which records the information. The information will include the customer information, the product information which can be presented in the form of UPC codes or other product identifiers so that the precise products or service purchased can be readily identified. The transaction clearinghouse 14 contacts the merchant 16 for the discount amount for each product or service and then sends a debit instruction to the financial institution 12 to obtain the credit for the customer 10 equaling the merchant discount. On the next monthly statement, the debit/credit card of the customer 10 is credited with the discount for each discount obtained. Alternatively, this information could be instantaneously obtained by the customer through an online internet service.

A more specific transaction will now be described with respect to the following example. A club member 10 purchases from a merchant 16 a quantity of office supplies, toys and beauty aids for the amounts of $50, $20 and $10 respectively. The merchant 16 has previously established with the transaction clearinghouse 14 that the discount in such items will be 20%, 10% and 15% respectively. The club member 10 uses the bank card issued by the participating financial institution 12 to pay the $80.00 (the sum of $50+$20+$10). The card is swiped through a optical or magnetic card reader and the information will be processed at the financial institution server and will also be detected by the transaction clearinghouse server. The transaction clearinghouse 14 will contact the server at the merchant level and check the detail on the transaction which will include an item by item purchase record. The merchant server will calculate the discounts of $10.00 ($50×20%) on office supplies, $2.00 ($20×10%) on toys and $1.50 ($10×15%) on beauty aids for a total discount of $13.50. The entire breakdown will be reported to the transaction clearinghouse server.

The transaction clearinghouse server then invoices the merchant for the $13.50 and stores the information. When the transaction clearinghouse 14 receives payment from the merchant 16, the club member's account is credited. The monthly bank statement sent to the club member 10 will include a marketing message such as "Thank you for shopping at Merchant with your Easy Reward Card on "date". Your loyalty discount is . . . $13.50.

Figure 3:
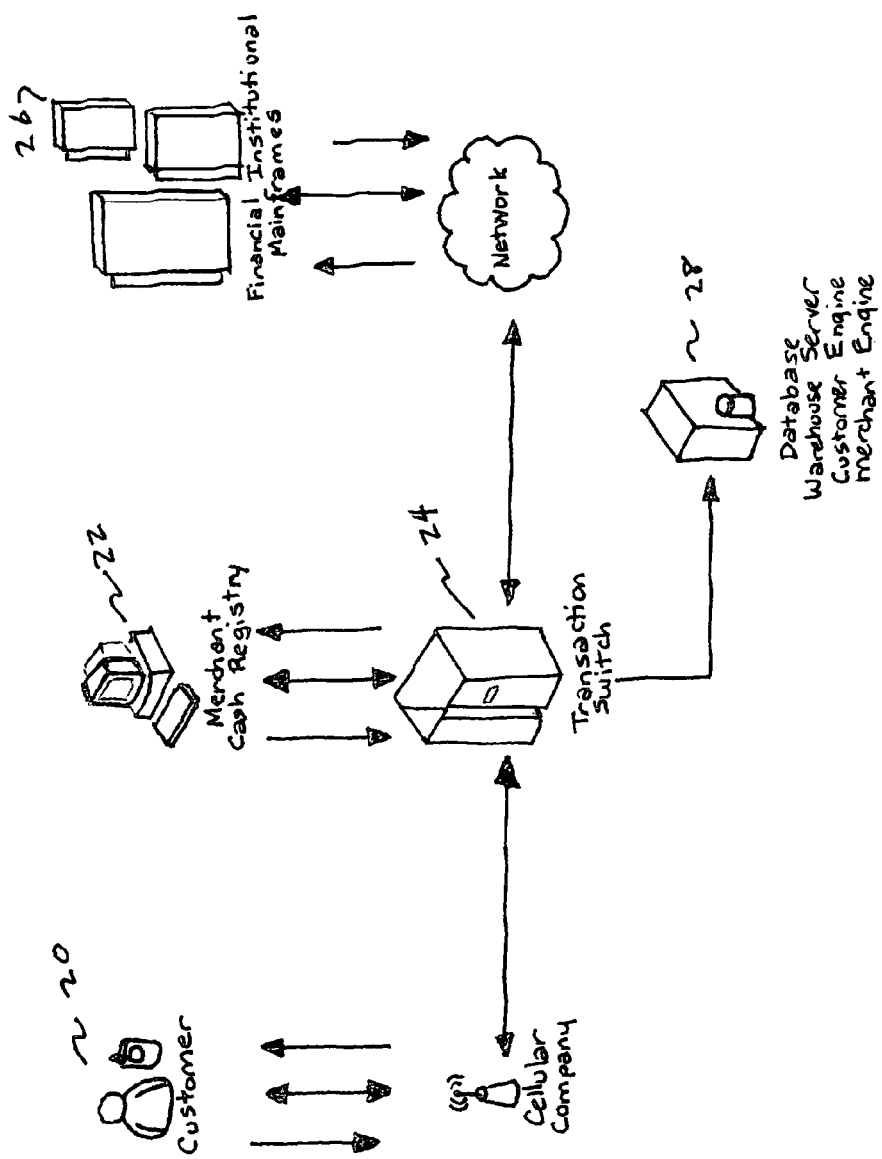
FIG. 3 is a diagram showing the cellular transaction process.

In an alternative embodiment as will be described with reference to FIG. 3, an integrated merchant/cellular program and switch system allows exchanging transaction information in a way that allows the customer 20 to bypass using a bank card. In this embodiment, for example a customer 20 initiates a purchase at the point of sale, i.e. the checkout station of the merchant 22. The merchant 22 sends information such as a merchant identification code to a transaction switch 24 which posts information to the participating financial institution 26 and to the transaction clearinghouse server 28. The merchant 22 also provides customer identifying information such as a name, customer number or customer telephone number. Upon receipt of the customer identification information and the merchant transaction information by the financial institution 26, the customer 20 is then contacted via cell phone by the financial institution 26 and information is provided by the customer 20 to the financial institution 26 in the form of a personal identification number (PIN) or other password confirming the customer's intent to purchase. The financial institution 26 then contacts the merchant 22 with Approved/Declined transaction status and the sale goes through or not according to the Approved/Declined status as in a regular credit card transaction.

Alternatively, the customer 20 can initiate the transaction via cell phone and the financial institution 26 would contact the merchant 22 for the merchant code and sale data.

The customer reward attributes will operate in the Cellular system in the same manner as in the card transaction system as previously described.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

We claim:

1. A method of facilitating a reward program for buying club members comprising the steps of:
   a) forming a reward alliance including club members, merchants and financial institutions;
   b) monitoring transactions between club members and merchants and financial institutions by a data clearinghouse server;
   c) providing said data clearinghouse server with purchase detail information from a merchant when a club member makes a purchase at a participating merchant using information obtained by said clearinghouse server from a financial institution server;
   e) said purchase detail information includes total price paid on each item and item by item discounts on purchases;
   f) said merchant authorizes said data clearinghouse server to obtain a club member refund from a merchant financial institution wherein said refund is based on said purchase detail information.

2. The method of facilitating a reward program for buying club members as set forth in claim 1, further comprising the step of:
   providing said merchant with a statement from said data clearinghouse server.

3. The method of facilitating a reward program for buying club members as set forth in claim 1, wherein:
   when a club member makes a purchase, said club member uses a card having a machine readable indicia thereon to purchase items.

4. The method of facilitating a reward program for buying club members as set forth in claim 3, wherein:
   said merchant scans said card through a scanning device which transmits club member information to said financial institution for purchase authorization.

5. The method of facilitating a reward program for buying club members as set forth in claim 1, further comprising the step of:

transmitting purchase authorization information using a cellular telephone.

6. The method of facilitating a reward program for buying club members as set forth in claim 1, further comprising the step of:

transmitting purchase detail information from said merchant to said data clearinghouse server.

7. The method of facilitating a reward program for buying club members as set forth in claim 1, further including the step of:

providing a buying club member with an account and providing said club member with a debit card.

8. The method of facilitating a reward program for buying club members as set forth in claim 1, further including the step of:

providing a buying club member with an account and providing said club member with a credit card.

9. The method of facilitating a reward program for buying club members as set forth in claim 8, further including the step of:

providing a buying club member with an account and providing said club member with a personal identification number.

* * * * *